United States Patent
Rea et al.

(10) Patent No.: US 9,202,497 B2
(45) Date of Patent: Dec. 1, 2015

(54) ADJUSTING A CLEARANCE BETWEEN A MAGNETIC HEAD AND A MAGNETIC RECORDING MEDIUM USING A MAGNETIC FORCE

(71) Applicant: Seagate Technology LLC, Cupertino, CA (US)

(72) Inventors: Chris Rea, Edina, MN (US); Raul Horacio Andruet, Woodbury, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/097,457

(22) Filed: Dec. 5, 2013

(65) Prior Publication Data

US 2015/0162040 A1    Jun. 11, 2015

(51) Int. Cl.
*G11B 21/02*  (2006.01)
*G11B 5/60*   (2006.01)

(52) U.S. Cl.
CPC .................... *G11B 5/6041* (2013.01)

(58) Field of Classification Search
None
See application file for complete search history.

(56) References Cited

U.S. PATENT DOCUMENTS

| | | | |
|---|---|---|---|
| 4,853,810 A | | 8/1989 | Pohl et al. |
| 5,157,568 A | * | 10/1992 | Katayama et al. .......... 360/234.7 |
| 5,223,998 A | * | 6/1993 | Tokuyama et al. ......... 360/234.7 |
| 6,600,634 B1 | * | 7/2003 | Kim et al. .................. 360/294.5 |
| 7,154,696 B2 | | 12/2006 | Nikitin et al. |
| 7,375,912 B2 | * | 5/2008 | Brannon et al. ................. 360/75 |
| 7,385,789 B2 | | 6/2008 | Hu et al. |
| 7,589,938 B2 | * | 9/2009 | Gatzen ....................... 360/294.7 |
| 7,660,080 B1 | | 2/2010 | Liu et al. |
| 7,688,537 B2 | * | 3/2010 | Kiyono et al. .................. 360/75 |
| 7,835,115 B2 | * | 11/2010 | Meyer ........................ 360/294.7 |
| 7,948,713 B2 | | 5/2011 | Ohta et al. |
| 8,995,076 B1 | * | 3/2015 | Olson et al. ..................... 360/55 |
| 2012/0327529 A1 | | 12/2012 | Hutchinson et al. |
| 2013/0063834 A1 | | 3/2013 | Hanchi et al. |

* cited by examiner

*Primary Examiner* — K. Wong
(74) *Attorney, Agent, or Firm* — Hollingsworth Davis, LLC (57) ABSTRACT

A media-facing surface of a magnetic head is positioned proximate a moving magnetic recording medium. A current is applied to an electromagnet of the magnetic head. The current induces a magnetic force between the magnetic head and the magnetic recording medium that adjusts a clearance therebetween.

20 Claims, 7 Drawing Sheets

ADJUSTING A CLEARANCE BETWEEN A MAGNETIC HEAD AND A MAGNETIC RECORDING MEDIUM USING A MAGNETIC FORCE

BACKGROUND

Magnetic hard disk drives utilize a transducer (e.g., read/write head) that is placed over a rotating magnetic disk. Generally, a small clearance is maintained between the transducer and the disk by a small cushion of air. Due to system disturbances (e.g., vibration, imperfections of the media surface) the disk drive will include a mechanism for finely adjusting this clearance between transducer and disk. For example, a small heater may be activated at a media-facing surface of the transducer, which causes deformations at the media-facing surface due to thermal expansion. Minimizing variations in the transducer-to-media clearance can minimize read/write errors and facilitate increasing areal density.

SUMMARY

The present disclosure is related to adjusting a clearance between a magnetic head and a magnetic recording medium using a magnetic force. In one embodiment, a media-facing surface of a magnetic head is positioned proximate a moving magnetic recording medium. A current is applied to an electromagnet of the magnetic head. The current induces a magnetic force between the magnetic head and the magnetic recording medium that adjusts a clearance therebetween.

In another embodiment, a magnetic head includes a media-facing surface that is held proximate a moving magnetic recording medium. An electromagnet is positioned proximate the media-facing surface. The electromagnet induces, in response to an applied current, a magnetic force between the magnetic head and the magnetic recording medium that adjusts a clearance therebetween.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

The present disclosure is generally related to an apparatus, a read and/or write head (which hereinafter may be referred to as a read/write head, read/write transducer, or slider) that utilizes electromotive forces to adjust a clearance between the magnetic head and the magnetic recording medium. This electromotive force is generated by an electromagnet in the read/write head which creates an attractive force between the read/write head and the magnetic recording media. While in conventional recording media this could risk erasure of data on the media, for certain types of media, such as heat-assisted magnetic recording (HAMR) media, this risk is significantly lowered.

A HAMR data storage medium uses high magnetic coercivity magnetic layers that are able to overcome superparamagnetic effects (e.g., thermally-induced, random, changes in magnetic orientations) that currently limit the areal data density of conventional hard drive media. In a HAMR device, a small portion, or "hot spot," of the magnetic medium is locally heated to close to its Curie temperature, thereby allowing magnetic orientation of the medium to be changed at the hot spot while being written to by a transducer (e.g., magnetic write pole). After the heat is removed, the region will maintain its magnetic state, thereby reliably storing the data for later retrieval.

Because of the relatively high magnetic coercivity of the magnetic medium, unheated regions of the medium may be relatively unaffected by magnetic fields of moderate strength originating from the read/write head. As such, a read/write head may use a magnetic field to generate an attractive force between the medium and the read/write head. The attractive force may be used to perform fine adjustments on clearances between the read/write head and recording medium.

A coil locatable within a read/write may generate a magnetic field on the order of 1000 Oe upon the media, which may result in an attracting force on the scale of $10^{-4}$N. This amount of force is sufficient for purposes such as finely adjusting spacing between the read/write head and the medium. The risk of erasure caused by this level magnetic field is low due to the relatively high coercivity of the magnetic medium, which may be at least 10 times the value of the solenoid coil, e.g., at least 10,000 Oe. Due to the relatively low coercivity of the soft underlayer of the medium (on the scale of 200 Oe or less), the soft underlayer may be easily saturated by the clearance-adjusting magnetic field. As such, after a pass of the read/write head using this magnetic field, the media soft underlayer may be reset with a favorable orientation. This may reduce potential domain noise in the soft underlayer during HAMR writing (e.g., domain-wall-induced noise).

The reliability of a read/write head in a HAMR device is dependent, among other things, on the temperatures with which the elements are exposed. Temperature contributions from a heater filament used to control the clearances between the read/write head and recording medium are non-negligible to the system. The resulting attractive force of an electromagnet coupled with an existing heating induced deformation increases the stroke efficiency of the device and reduces the power requirement for heater clearance control and thereby the operating temperatures. These reduced operating temperatures help mitigate complications attributed to a higher operating temperature.

Figure 1:
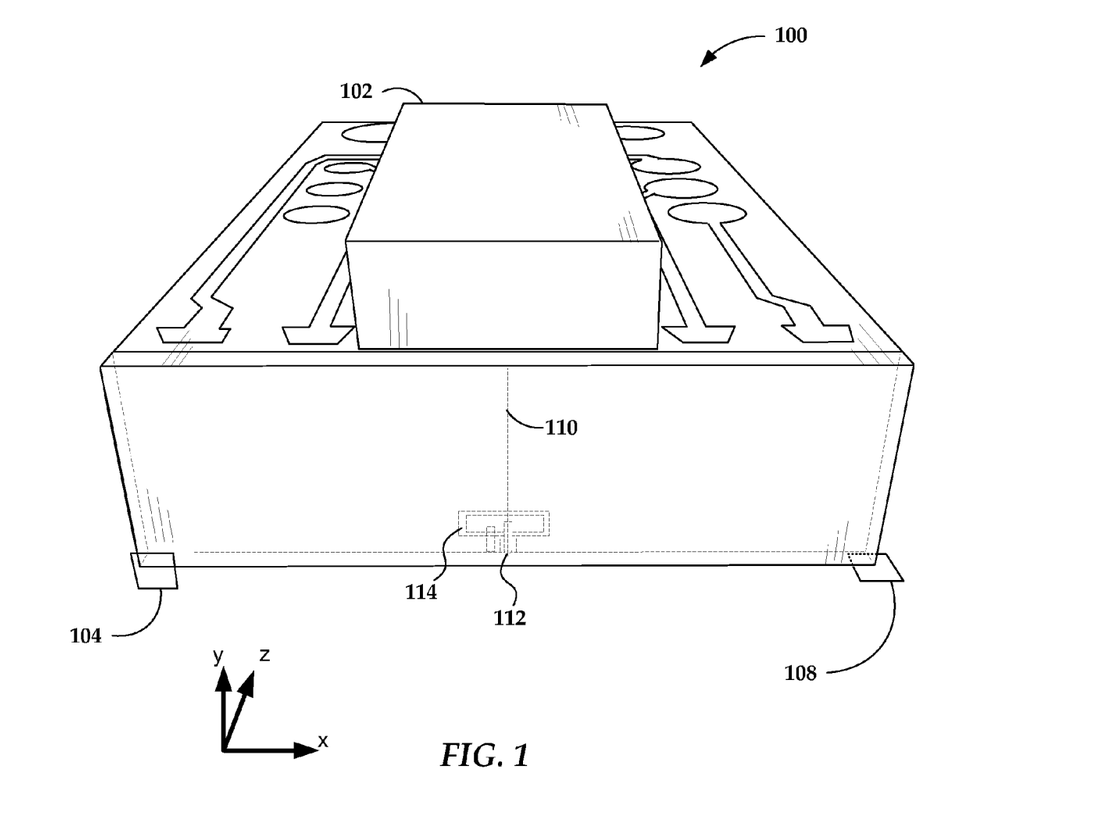
FIG. 1 is a perspective view of a slider assembly according to an example embodiment.

In some embodiments, the magnetic recording head arrangement is configured as a heat assisted magnetic recording (HAMR) slider assembly 100 as shown in FIG. 1. The slider assembly 100 includes an energy source 102 (e.g., laser diode) configured to produce laser light that energizes an optical antenna, also referred to as a near field transducer (NFT) 112. The laser light produced by the energy source 102 is guided through an optical waveguide 110 and is focused on the NFT 112 by a focusing device such as a tapered optical waveguide or a parabolic mirror. The energy source 102 is shown here as integral to the slider assembly, although in other arrangements a laser or other energy source may be externally located.

The slider assembly 100 tracks across the magnetic recording medium in a direction generally indicated by the x-axis of FIG. 1, also referred to as the cross-track direction. Relative to the slider assembly 100, the magnetic recording medium rotates in the z-axis direction, referred to as the downtrack direction. The edge of the slider that first passes over any position of the rotating recording medium in the downtrack direction is referred to as the leading edge, and the edge of the slider that is last to pass over the position of the recording medium is referred to as the trailing edge, designated by plane 104. The slider assembly 100 reads and/or writes bits to the rotating magnetic recording medium as the magnetic recording medium rotates relative to the slider.

The slider assembly includes an electromagnet 114 at or near the media-facing surface 108. The electromagnet 114 may be energized to interact with a media soft underlayer and produce an attractive force that assists in actuation of the slider assembly 100 to the magnetic recording media. The attractive force produced by the electromagnet 114 may reduce the amount of heating needed to adjust clearance of the slider assembly 100. The magnetic field produced by the electromagnet 114 does not erase the magnetic recording media due to the high coercivity of at least a part of the magnetic medium that stores the data (e.g., upper layers). It will be understood that while the present embodiments are described as HAMR storage devices, the concepts related to using electromagnetic forces may be applied to any analogous device using a magnetic medium that is resistant to being erased or otherwise negatively affected by magnetic fields of sufficient strength to influence head-media spacing.

Figure 2:
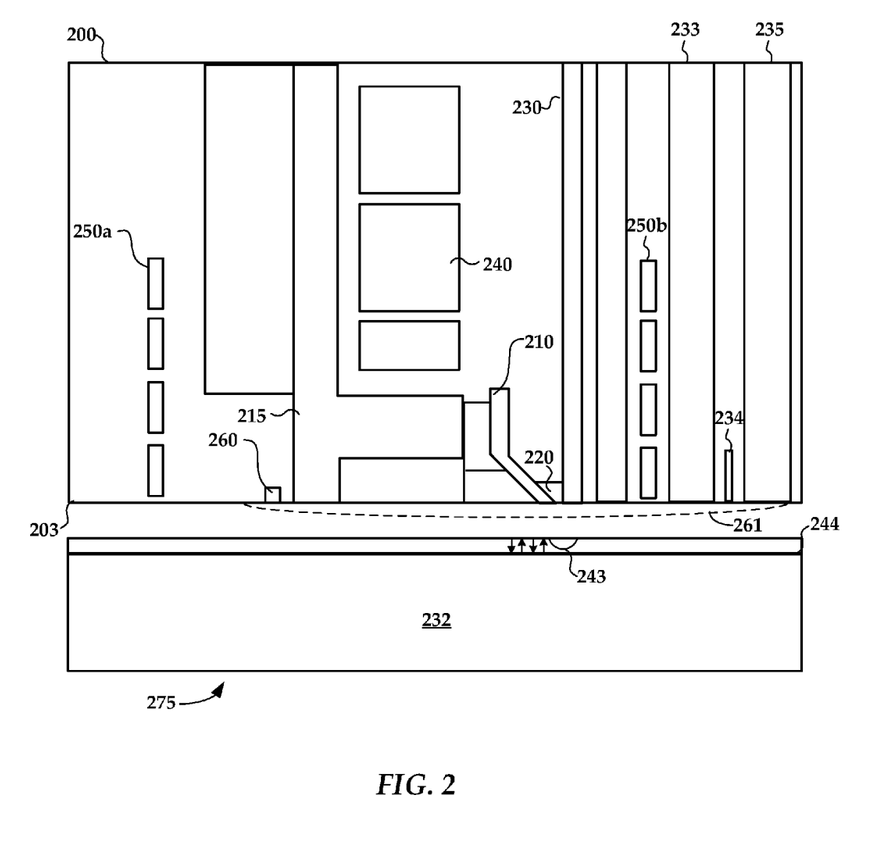
FIG. 2 is a cross-sectional view of a head transducer according to an example embodiment.

In FIG. 2, a cross-section diagram shows a HAMR head transducer 200 according to various embodiments. An NFT 220 is located between a write pole 210 and a waveguide 230 at a media-facing surface 203. The head transducer 200 is shown positioned over a writeable medium 275 (e.g., magnetic disk) generally includes a plate or substrate 232 on which at least a hard magnetic layer 244 is deposited or otherwise formed. A small portion or spot 243 of the layer 244 is heated via waveguide 230 and NFT 220 to reduce the coercivity of the material enough so that the magnetic field from the magnetic write pole 210 is strong enough to change the magnetization direction of the recording layer 244. Bits of information may then be recorded in the form of a perpendicular upward downward magnetization direction for a series of magnetic domains in the layer 244.

The head transducer 200 includes a write coil 240 which generates magnetic fields of the write pole 210. The magnetic field returns through a return pole 215. The write coil 240 is energized via control circuitry to write data to the medium 275. A read transducer 234 may include a magnetoresistive element that facilitates reading data from the medium 275. The read transducer 234 is surrounded by shields 233, 235 that protect the read transducer 234 from stray electromagnetic fields.

During reading and writing, control circuitry will attempt to hold the read transducer 234 and write pole 210 close to the medium 275 at a predetermined clearance value. A cushion of air between the medium 275 and head transducer 200 sets a coarse value of separation, and fine adjustments of clearance may be made using a heater (not shown). Due to thermal expansion of the surrounding material, the heat can cause a thermal protrusion at the media-facing surface 203, indicated by dashed line 261. Generally, the heater is used to finely adjust head-media spacing near the protrusion to obtain a desired spacing between the media 275 and read/write transducers 234, 210.

One or more thermal sensors, e.g., thermal coefficient of resistance (TCR) sensors, can be used to detect and control the protrusion. These sensors may be used during manufacturing to set head-disk spacing. Thermal sensors may also be used for thermal asperity (TA) detection. As shown in FIG. 2, thermal sensor 260 is located within the protrusion region 261 adjacent the return pole 215 (but outside of the writer components). The thermal sensor 260 is coupled to signal processing circuitry as is known in the art. The circuitry determines temperatures at or near the media-facing surface 203, and those measured temperatures can be used for a number of purposes, such as controlling a heater to adjust head-media spacing at the protrusion region 261.

The adjustment of head-media spacing can be further adjusted via a solenoid. In FIG. 2, two solenoids 250a-b are shown. Both solenoids 250a-b may be used together, or only one of the solenoids 250a-b may be used. The solenoid 250b includes coils that are located between the read transducer 234 and write pole 210. The shield 233 protects the read transducer 234 from stray electromagnetic fields induced by the solenoid 250b at the air-bearing surface (ABS). An additional thin shield may be introduced between the solenoid 250b and read transducer 234.

Another way to protect the read transducer 234 from stray electromagnetic fields is to space the solenoid 250b farther from the read transducer 234 than the write pole 210. This may be accomplished as shown by solenoid 250a, which is located away from the write pole 210. Solenoid 250a includes coils that are located adjacent the return pole 215 but away from other writer components, such as write coil 240 and write pole 210. Solenoid 250a is farther away from the read transducer 234 than solenoid 250b.

The protrusion 261 profile induced by a combination of the heater and solenoid 250a-b may be similar to that of a wide writer, broader than the heater alone and narrower than laser-induced writer protrusion (LIWP). The protrusion 261 magnitude is related to the power dissipated in the device, which is dependent on the impendence of the solenoids 250a-b. In some embodiments the modulation due to the attractive force of the solenoids 250a-b occurs in a low MHz regime, therefore the impedance is dominated by resistance and defined by the number of coil turns. As a result, in some examples, the writer heater may be completely replaced with a solenoid depending on the layout of the solenoid and number of coil turns. Examples of solenoid layouts include a planar coil disposed on a leading/trailing-edge-parallel plane, coil formed on an ABS-parallel plane, helically wound coils, or a combination of helical and planar coil windings.

In one embodiment, the solenoid device uses a nominal 30 mA steady-state current, consuming 60 mW of power. In a power range of 0-30 mW the solenoid may mostly perform as a heater. Beyond 30 mW, the solenoid will provide an increasingly larger electromagnetic field as well as function as a heater. The electromagnetic field component will provide an assistive boost to the heater in adjusting the head-media spacing at the protrusion region 261.

In some embodiments, clearance may be maintained using the existing power/current levels that are applied to writer heaters and using all of the shield width at the air bearing surface. In such a case, the heater wire can be turned into a planar solenoid and the amperian flux can be used to interact with the media soft underlayer. The planar solenoid acts as a heater over relatively large time scales to create a thermal protrusion that moves the read/write transducers closer to the media. The resulting force created by the amperian flux would then act as a modulation over relatively smaller time scales to further refine the clearance distance and react to surface asperity and other small-scale disturbances. This magnetic force works most effectively when close to a specified clearance, and the magnetic contribution acts as a modulation on the background to dynamically accommodate for "preheat" issues.

As a control mechanism, the magnetic force can be modulated on a scale of 10 nSec as a lower limit, with an upper limit of 4 mSec when operating at a resonance frequency on the scale of 100 kHz (e.g., 220 kHz). This magnetic force can be modulated at a much shorter time constant, based on the lower limit, than only heater induced expansion at approximately 0.1 msec, diode heating at 1 msec and local LIWP at 0.004 msec. This leads to an opportunity to modulate clearance to respond to disturbances over different time scales using two or more mechanisms at the same time (e.g., thermal expansion and magnetic force).

In some embodiments, the soft underlayer can be saturated and still obtain an attractive force from an electromagnetic force if the soft underlayer has Hc as high as 400 Oe. For example, the field of a 14-planar-turn solenoid (having inductance of about 100 nH) can saturate the soft underlayer using around 25-45 mA to create a field of at least 9000 Oe. This would case around 50-70 mW of power to be dissipated as heat at the maximum actuation. A solenoid of this configuration may switch at a rise time of 1-2 nsec, which is much faster than heater expansion time constants.

The modulation response will be bound by the ability of the advanced air-bearing and mass of the read/write head to respond to the applied magnetic force, not the magnetic force switching rate. It can be further adapted to different time scales by monitoring the reader clearance. One advantage of this design is the soft underlayer preconditioning (setting) as well as the rapidly modulated and broad applied force at the transducer region.

Figure 3:
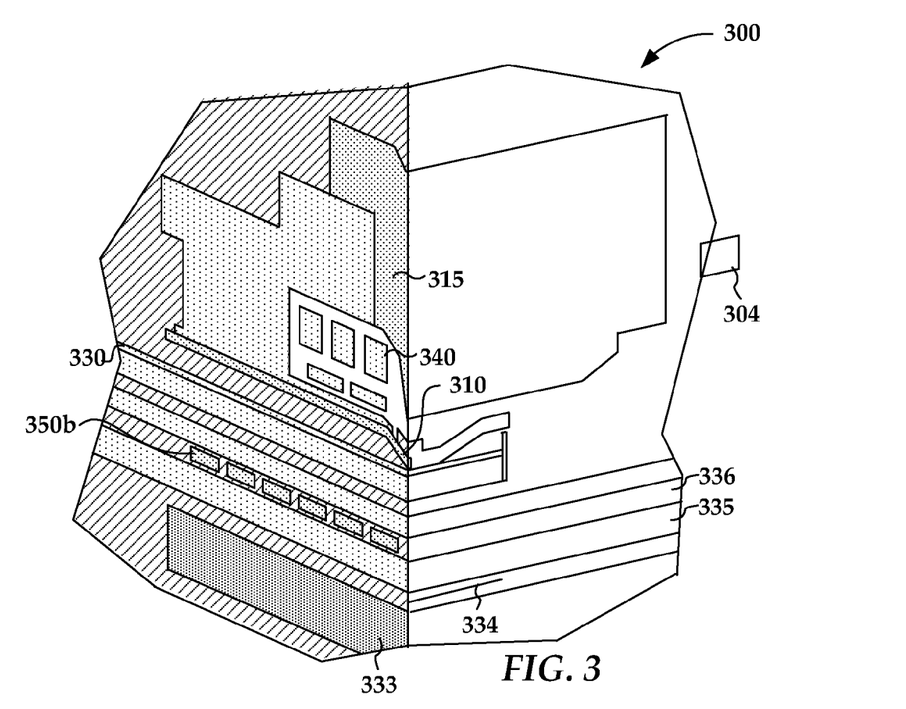
FIGS. 3 and 4 are cross-section diagrams showing head transducers according to various embodiments.
Figure 4:
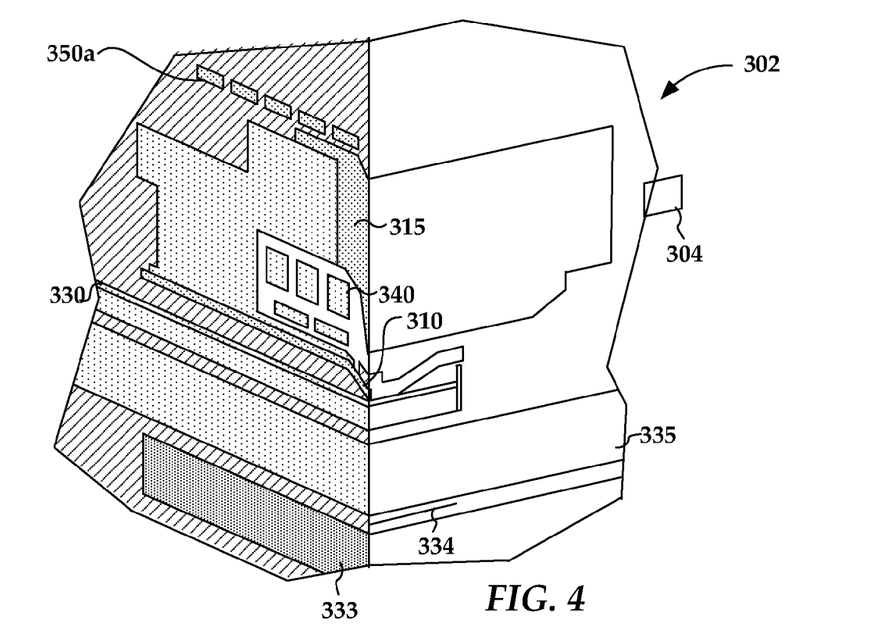

In FIGS. 3 and 4, a cross-section diagram shows HAMR head transducers 300, 302 according to various embodiments. A waveguide 330 delivers energy to an NFT (not visible in this view) located proximate a media-facing surface 304. The head transducer 300 includes a write coil 340 which generates magnetic fields at the write pole 310. The magnetic field returns through a return pole 315. The write coil 340 is energized via control circuitry to write data to a medium. A read transducer 334 may include a magnetoresistive element that facilitates reading data from the medium. The read transducer is surrounded by shields 333, 335 that protect the read transducer 334 from stray electromagnetic fields.

During reading and writing, control circuitry will attempt to hold the read transducer 334 and write pole 310 close to the medium at a predetermined clearance value. A cushion of air between the medium and head transducer 300 sets a coarse value of separation, and fine adjustments of clearance may be made using a heater (not shown). Due to thermal expansion of the surrounding material, the heat can cause a thermal protrusion. Generally, the heater is used to finely adjust head-media spacing near the protrusion to obtain a desired spacing between the media and read/write transducers 334, 310.

The adjustment of head-media spacing can be further adjusted via a solenoid. In the transducer 300 of FIG. 3, solenoid 350b includes coils that are located between the read transducer 334 and write pole 310. The shield 333 protects the read transducer 334 from stray electromagnetic fields induced by the solenoid 350b at the air-bearing surface (ABS). A shield between the read transducer 334 and write pole 310 may be split into shields 335, 336, the solenoid 350b being located therebetween.

In the transducer 302 of FIG. 4, solenoid 350a is placed above the write pole 310. Solenoid 350a includes coils that are located adjacent the return pole 315 but outside of the writer components such as coils 340 and write pole 3100. Solenoid 350a is farther away from the read transducer 334 than solenoid 350b. This protects the read transducer 334 from stray electromagnetic fields, which lessens chances of inducing noise such as magnetic domain wall motion. This location, being farther from the write pole 310 and read transducer 334, can broaden the heat-induced protrusion profile, which may be centered on the write pole 310 and read transducer 334. A broadened profile can reduce damage (e.g., burnish, surface contamination) that results when the NFT (which is located proximate the tip of the write pole 310) contacts the medium.

Figure 5:
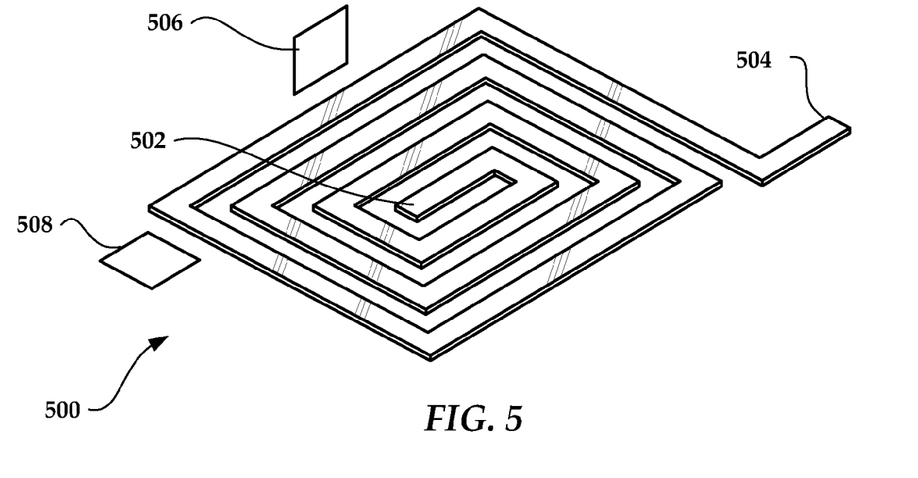
FIGS. 5 and 6 are perspective views of solenoid coils according to example embodiments.

In reference to FIG. 5, a perspective view illustrates a planar electromagnetic coil 500 that may be used in a solenoid according to an example embodiment. The coil 500 includes first and second ends 502, 504 through which current is applied. In response to the current, an electromagnetic force is generated. The coils are formed on a substrate-parallel surface represented by plane 508, e.g., by using a process such as layer deposition on a substrate. Generally, in a read/write head, the substrate parallel surfaces are normal to a media-facing surface, as represented by plane 506. It should be noted that this does not preclude forming similar coils parallel to the media-facing surface, or at non-right angles to the media-facing surface.

Figure 6:
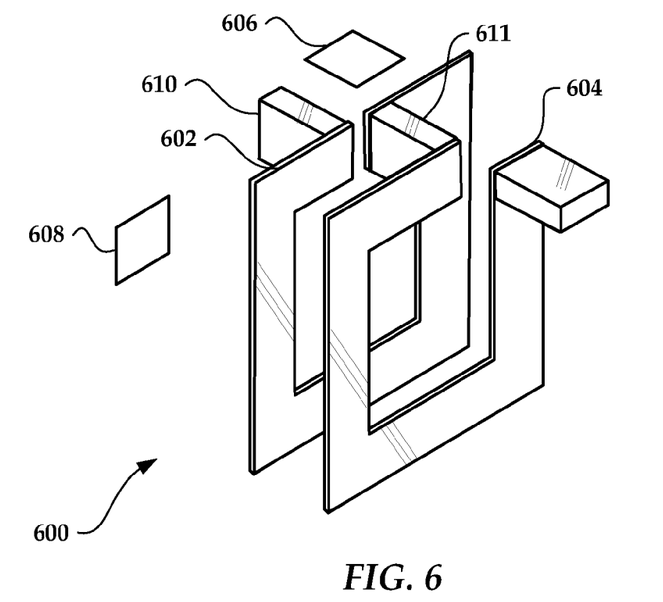

In reference to FIG. 6, a perspective view illustrates an electromagnetic coil 600 that may be used in a solenoid according to an example embodiment. The coil 600 is a helical configuration, and includes first and second ends 602, 604 through which current is applied. In response to the current, an electromagnetic force is generated. The coils are stacked on top each other on separate substrate-parallel surfaces, one of which is represented by plane 608, e.g., by using a process such as layer deposition on a substrate. Each coil is electrically coupled to an adjacent coil using vias, such as vias 610-612 shown. It should be noted that while only two coils are shown, this can be extended to any number of coils. Generally, in a read/write head, the substrate parallel surfaces are normal to a media-facing surface, as represented by plane 606. It should be noted that this does not preclude forming similar coils parallel to the media-facing surface, or at non-right angles to the media-facing surface.

Figure 7:
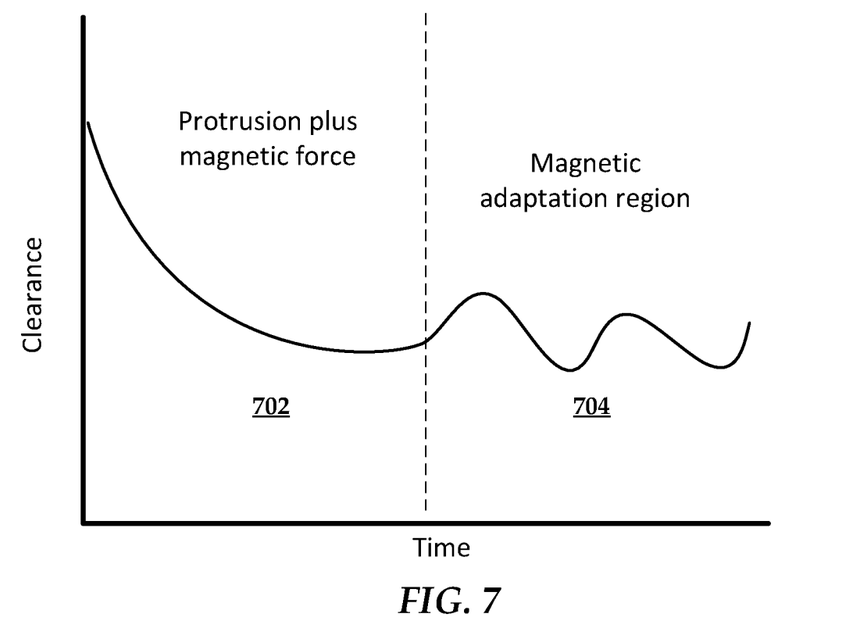
FIG. 7 is a graph illustrating clearance between a read/write head and a magnetic medium as a function of time for a combination of heating and magnetic forces according to an example embodiment.

In reference to FIG. 7, a graph illustrates the clearance between a read/write head and a magnetic medium as a function of time for a combination of heating and magnetic forces according to an example embodiment. Over a first time period, the 702 the clearance changes as a result of changing input both heat and magnetic force using one or more control signals applied to the heater and solenoid. In this region 702 the clearance is coarsely adjusted and the heating dominates changes in the clearance. In time period 704, the clearance is fine-tuned of by making small adjustments of the applied signal that vary the electromagnetic force.

In an embodiment where the solenoid and heater are formed together (e.g., in series), one signal will induce the changes in regions 702 and 704. Because the solenoid is farther away in region 702, the signal will primarily affect clearance due to thermal expansion. In region 704, the signal adjusts both thermal expansion and electromagnetic force. Because the thermal expansion response time is slower than the electromagnetic force, the electromagnetic force will dominate in region 704 for small variations, and both thermal expansion and electromagnetic force will affect longer term clearance changes.

Figure 8:
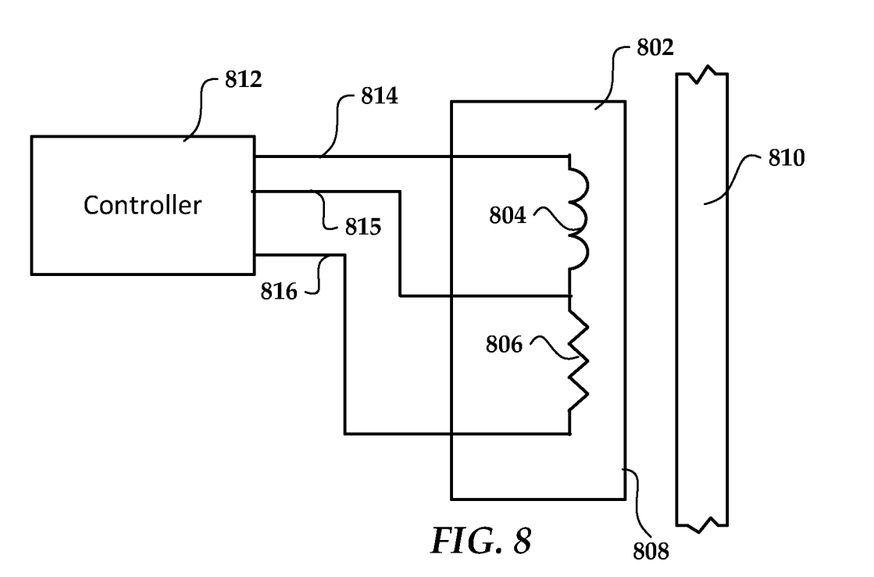
FIGS. 8-10 are schematic diagrams of clearance adjustment circuits according to example embodiments.

In FIG. 8, a schematic diagram illustrates a clearance control circuit according to an example embodiment. A magnetic head 802 (e.g., read/write head) includes an electromagnet 804 (e.g., coil) and heater 806 (e.g., resistive heater) near a media facing surface 808. The media-facing surface 808 is held proximate a moving magnetic recording medium 810, e.g., recording medium onto which the magnetic head records data. The electromagnet 804 induces, in response to an applied current, a magnetic force between the magnetic head 802 and the magnetic recording medium 810 that adjusts a clearance therebetween.

The electromagnet 804 and heater 806 are connected to a controller 812 via signal lines 814-816. In this arrangement, the electromagnet 804 and heater 806 are in parallel, and share a common signal line 815. The controller 812 may drive the electromagnet 804 and heater 806 with different voltages on lines 814, 815 and the common line 815 tied to ground. Other driving signals may be used (e.g., fixed voltages and varying currents). Generally, parallel wiring of the electromagnet 804 and heater 806 allows for flexibility in driving these components (e.g., one may be shut off while the other is being used), however requires three connections at the magnetic head 802, which are at a premium on a microscopic-sized device such as this.

It should be noted that in any of the embodiments described above, the solenoid coils may perform more than one function. As already noted, one or more of the solenoid coils may also generate heat that provides relatively large-time-constant clearance adjustments due to thermally-induced protrusion. In another example, a coil (e.g., lead coil) of a solenoid may include a resistive filament with a known temperature coefficient of resistance (TCR). Examples of such arrangements are shown in FIGS. 9 and 10.

Figure 9:
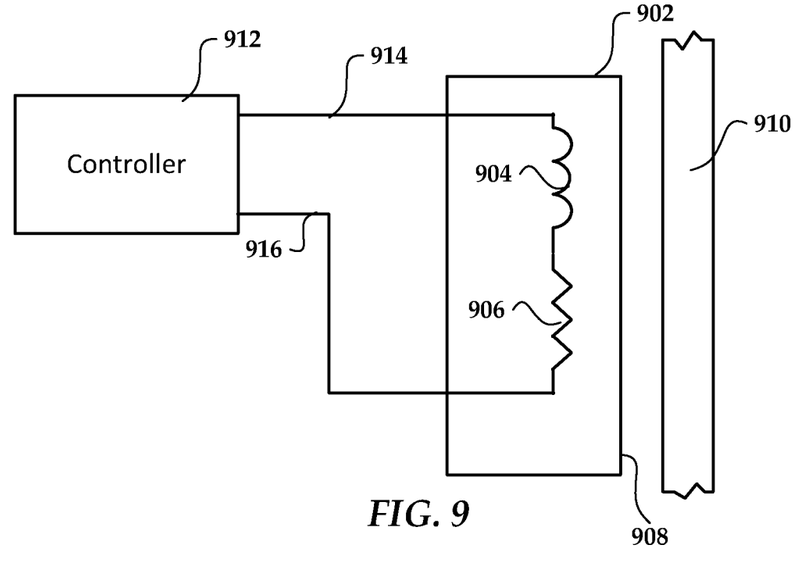

In FIG. 9, a schematic diagram illustrates a clearance control circuit according to another example embodiment. A magnetic head 902 (e.g., read/write head) includes an electromagnet 904 (e.g., coil) and heater 906 (e.g., resistive heater) near a media facing surface 908. The media-facing surface 908 is held proximate a moving magnetic recording medium 910. The electromagnet 904 induces, in response to an applied current, a magnetic force between the magnetic head 902 and the magnetic recording medium 910 that adjusts a clearance therebetween.

The electromagnet 904 and heater 906 are connected to a controller 912 via signal lines 914, 916. In this arrangement, the electromagnet 904 and heater 906 are represented as being in series. It will be understood that the functions of electromagnet 904 and heater 906 may be performed by a single component (e.g., planar or helical coil), in which case the components 904, 906 may be modeled as being any combination of series and/or parallel connected coils and resistors. The controller 812 may drive the electromagnet 904 and heater 906 together, e.g., using a changing voltage. As shown in the graph of FIG. 7, one of the electromagnet 904 or heater 906 may dominate in changing clearance control based on, for example, clearance between the head 902 and medium 910 and or frequency of the applied signal.

Figure 10:
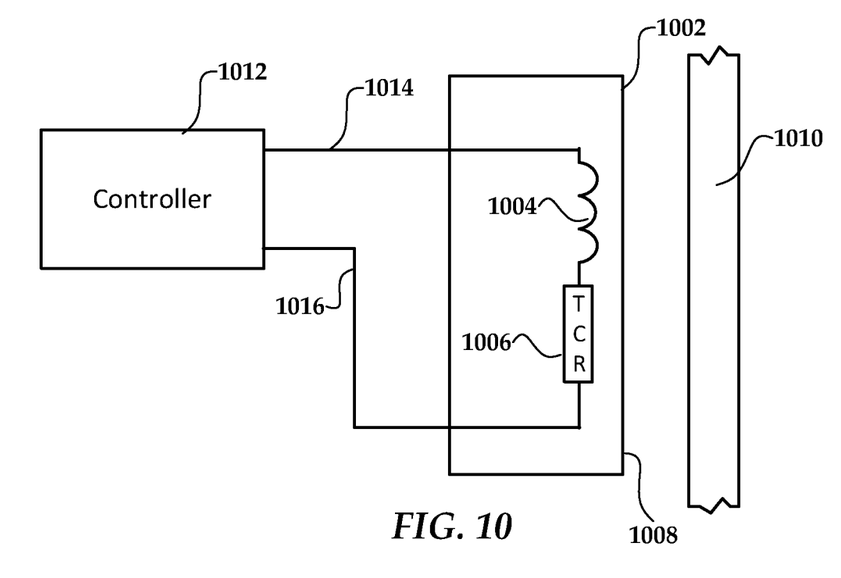

In reference to FIG. 10, a schematic diagram illustrates a clearance control circuit according to another example embodiment. A magnetic head 1002 (e.g., read/write head) includes an electromagnet 1004 (e.g., coil) and TCR sensor 1006 near a media facing surface 1008. The media-facing surface 1008 is held proximate a moving magnetic recording medium 1010. The electromagnet 1004 induces, in response to an applied current, a magnetic force between the magnetic head 1002 and the magnetic recording medium 1010 that adjusts a clearance therebetween.

The TCR sensor 1006 may be used for detecting contact between the magnetic head 1008 and medium 1010 and/or detecting a clearance therebetween. The TCR sensor 1006 may be configured as a lead coil of the electromagnet 1004 and be made from a material with relatively high TCR such as Ru. The rest of the coils of the electromagnet 1004 could be made from a material with relatively low (preferably close to zero) TCR. In this way, a current response of the solenoid could be used to perform thermal measurements.

The electromagnet 1004 and TCR sensor 1006 are connected to a controller 1012 via signal lines 1014, 1016. In this arrangement, the electromagnet 1004 and TCR sensor 1006 are in series. A parallel arrangement could also be used, e.g., as shown for electromagnet 804 and heater 806 in FIG. 8. The controller 1012 may drive the electromagnet 1004 and TCR sensor 1006 together, e.g., using a changing voltage, and measure a current response. A heater (not shown) may also be included, e.g., as part of the electromagnet 1004, as another in-series component, or as a parallel-wired component.

Generally, the controllers 812, 912, 1012 may include any combination of analog and digital circuitry configured to control clearance between the magnetic head and magnetic medium. The controllers may include preamplifiers, filters, and other signal conditioning circuits to facilitate controlling the heaters and solenoids. These conditioning circuits can also process signals that are read back from the heaters, solenoids, and/or TCR sensors. The controllers 812, 912, 1012 may include logic circuits that are programmable to provide control functions as described herein.

Figure 11:
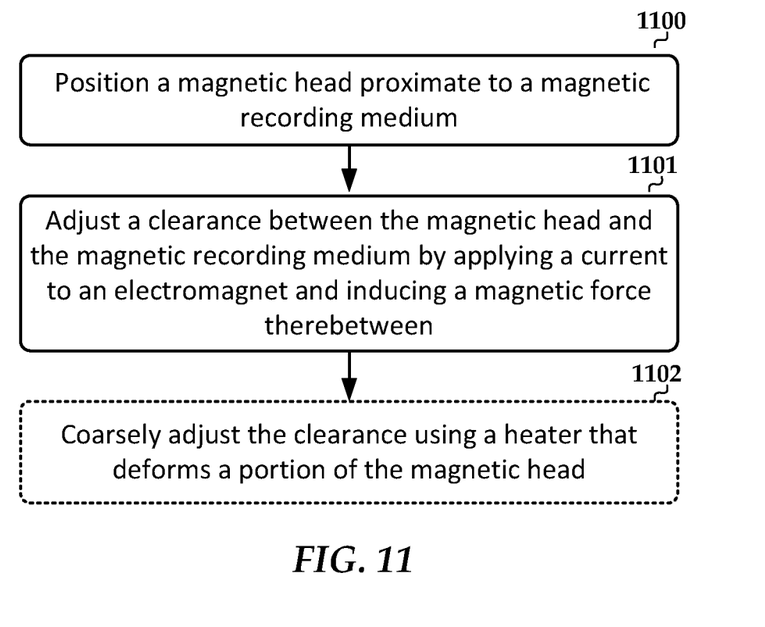
FIG. 11 is a flowchart of a method according to an example embodiment.

In reference to FIG. 11, a flowchart illustrates a method according to an example embodiment. The method involves positioning 1100 a media-facing surface of a magnetic head proximate to a moving magnetic recording medium. Next, applying a current to an electromagnet of the magnetic head 1101, the current then inducing a magnetic force between the magnetic head and the magnetic recording medium that adjusts a clearance therebetween. The method optionally involves coarsely adjusting 1102 the clearance using a heater that deforms a portion of the media-facing surface.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to facilitate managing caching in data storage devices as described above.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A method comprising:
   positioning a media-facing surface of a magnetic head proximate a moving magnetic recording medium; and
   applying a clearance control current to an electromagnet of the magnetic head, the clearance control current inducing a magnetic force between the magnetic head and the magnetic recording medium that controls a clearance therebetween.

2. The method of claim 1, further comprising coarsely controlling the clearance using a heater that deforms a portion of the media-facing surface, wherein the magnetic force performs a fine adjustment of the clearance.

3. The method of claim 2, wherein a first time constant of the magnetic force is significantly less than a time constant of the heater.

4. The method of claim 1, wherein the magnetic recording medium comprises a heat-assisted magnetic recording medium.

5. The method of claim 1, wherein the magnetic recording medium has a sufficiently large coercivity that a magnetic field that generates the magnetic force does not erase data stored on the magnetic recording medium.

6. The method of claim 1, wherein the electromagnet is further configured as a heater induces a deformation in a portion of the media-facing surface in response to the clearance control current, the method further comprising controlling the clearance between the magnetic head and the magnetic recording medium via the deformation, wherein a first time constant of the magnetic force is significantly less than a time constant of the deformation.

7. The method of claim 1, wherein the electromagnet is separate from a write pole of the magnetic head.

8. The method of claim 1, further comprising detecting the clearance via a thermal sensor of the magnetic head, and wherein a value of the clearance control current is based on the detected clearance.

9. The method of claim 1, wherein the electromagnet is further configured as a thermal coefficient of resistance thermal sensor.

10. A magnetic head comprising:
    a media-facing surface that is held proximate a moving magnetic recording medium;
    a write coil; and
    an electromagnet positioned proximate the media-facing surface and separate from the write coil, the electromagnet inducing, in response to an applied clearance control current, a magnetic force between the magnetic head and the magnetic recording medium that controls a clearance therebetween.

11. The magnetic head of claim 10, further comprising a heater that deforms a portion of the media-facing surface, the heater coarsely controlling the clearance and the magnetic force performing a fine adjustment of the clearance.

12. The magnetic head of claim 11, wherein a first time constant of the magnetic force is significantly less than a time constant of the heater.

13. The magnetic head of claim 11, wherein the electromagnet comprises the heater.

14. The magnetic head of claim 10, wherein the magnetic recording medium has a sufficiently large coercivity such that a magnetic field that generates the magnetic force does not erase data stored on the magnetic recording medium.

15. The magnetic head of claim 10, wherein the electromagnet is further configured as a heater that deforms a portion of the media-facing surface and further affects the clearance between the magnetic head and the magnetic recording medium.

16. The magnetic head of claim 15, wherein a first time constant of the magnetic force is significantly less than a time constant of the heater.

17. The magnetic head of claim 10, wherein the electromagnet is further configured as a thermal coefficient of resistance thermal sensor.

18. A system comprising:
    a magnetic recording medium;
    a magnetic head comprising:
       a media-facing surface that is held proximate to the magnetic recording medium; and
       an electromagnet positioned proximate the media-facing surface; and
    a control circuit coupled to the magnetic head and applying a clearance control current to the electromagnet, the current producing a magnetic force between the magnetic head and the magnetic recording medium that controls a clearance therebetween.

19. The system of claim 18, the magnetic head further comprising a heater that deforms a portion of the media-facing surface in response to a heater current from the control circuit, the heater coarsely controlling the clearance and the magnetic force performing a fine control of the clearance, wherein a first time constant of the magnetic force is significantly less than a time constant of the heater.

20. The system of claim 18, wherein the magnetic recording medium has a sufficiently large coercivity such that a magnetic field that generates the magnetic force does not erase data stored on the magnetic recording medium.

* * * * *